United States Patent
Menard

(10) Patent No.: US 6,657,797 B2
(45) Date of Patent: Dec. 2, 2003

(54) PRECISION FIELD LENS ADJUSTMENT APPARATUS

(75) Inventor: Jean Pierre Menard, Fremont, CA (US)

(73) Assignee: Aurora Systems, Inc., San Jose, CA (US)

( * ) Notice: Subject to any disclaimer, the term of this patent is extended or adjusted under 35 U.S.C. 154(b) by 0 days.

(21) Appl. No.: 09/816,821

(22) Filed: Mar. 22, 2001

(65) Prior Publication Data

US 2002/0135892 A1 Sep. 26, 2002

(51) Int. Cl.$^7$ ................................................. G02B 7/02
(52) U.S. Cl. .................................................. 359/819
(58) Field of Search ................................ 359/694, 703, 359/819, 822, 829, 830

(56) References Cited

U.S. PATENT DOCUMENTS

| | | | | |
|---|---|---|---|---|
| 2,307,345 A | * | 1/1943 | Zuber | 359/823 |
| 4,129,376 A | * | 12/1978 | Yotsukura | 399/178 |
| 4,408,830 A | * | 10/1983 | Wutherich | 33/1 M |
| 5,050,963 A | * | 9/1991 | Murakami | 359/808 |
| 5,898,527 A | * | 4/1999 | Sawai et al. | 359/819 |

* cited by examiner

*Primary Examiner*—Ricky Mack
(74) *Attorney, Agent, or Firm*—Henneman & Saunders; Larry E. Henneman, Jr.

(57) ABSTRACT

An adjustment apparatus (10) for adjusting the field lens (14) with respect to an LCD imager (13). The field lens (14) may be mounted off center and/or may be only a segment of a complete lens. Guide fingers (20) on an assembly housing (18) fit within guide slots (26) of a field lens mount (16) to prevent relative rotation thereof. The field lens (14) is secured within the field lens mount (16). An internally threaded ring (22) mates with external threads (23) on the field lens mount (16) to move the field lens mount (16) in or out relative to the imager (13). A retainer (28) has preload flexures (30) which press against posts (32) on the field lens mount (16) for providing preload tension thereon. Adjustment teeth (24) on the outside of the threaded ring (22) provide a means for rotating the threaded ring (22).

23 Claims, 2 Drawing Sheets

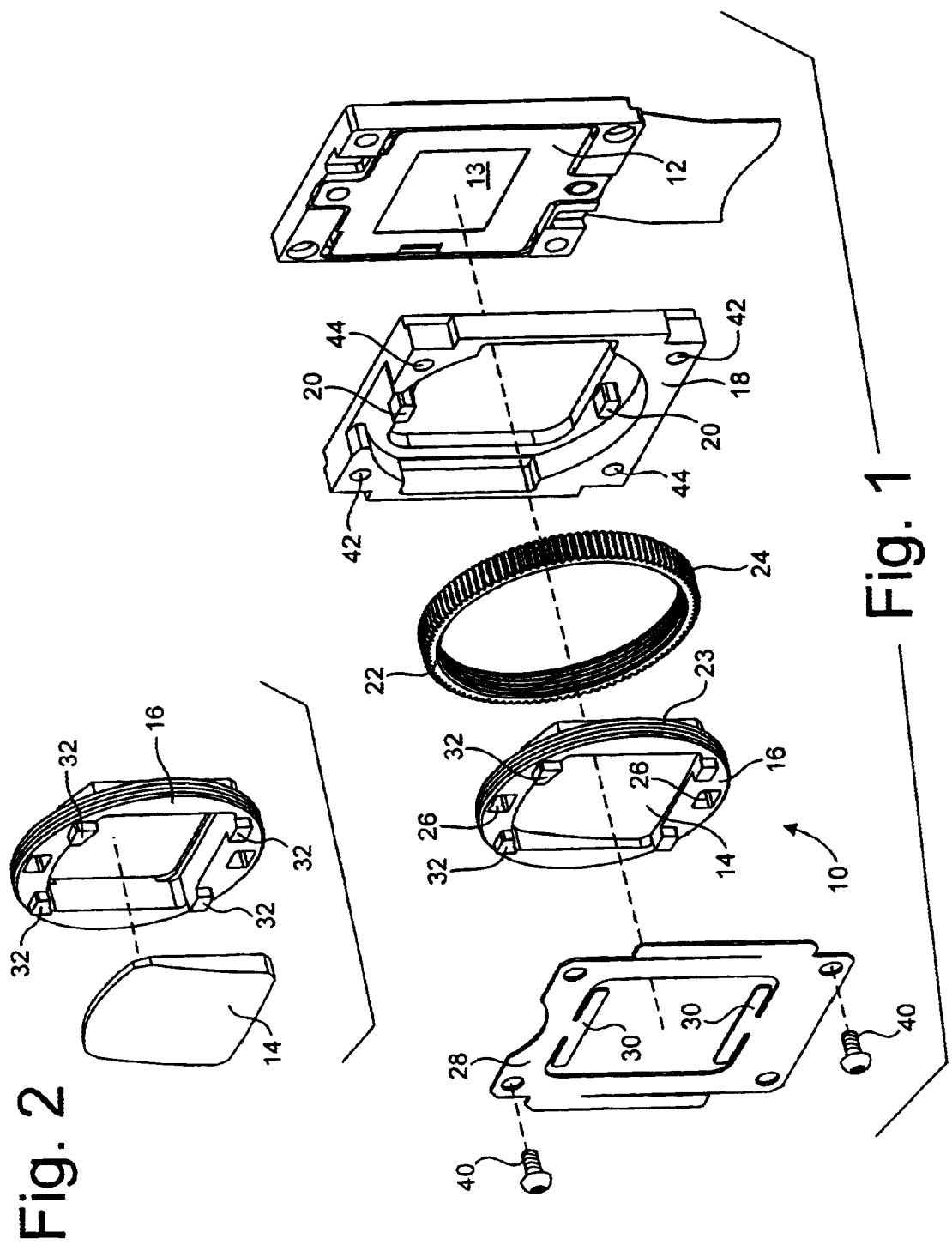

PRECISION FIELD LENS ADJUSTMENT APPARATUS

TECHNICAL FIELD

The present invention relates to the field of electronic imaging devices, and more particularly to a method and apparatus for precision optical adjustment of a field lens for an imaging device such as a liquid crystal display ("LCD") imaging device. The predominant current usage of the inventive precision field lens adjustment apparatus is in the mounting and adjustment of reflective imaging devices in a multi channel projection system, wherein it is particularly important to maintain a precise relationship between a reflective surface of the LCD and a mounting surface.

BACKGROUND ART

Projection type imaging devices commonly use micro LCD imagers. Since the pixel size and spacing on these imagers are so small, they must be precisely placed in relation to the surface whereon they are mounted. Further, the imager must be kept perfectly aligned in tilt, since even the slightest distortion of the imager will result in a portion of the imager's pixels being out of the focal plane and/or out of alignment. Moreover, it is important to maintain the tilt relationship of the field lens and the imaging device in order to maintain uniformity of the focal plane and to enhance convergence with other such devices in the system. It is known in the art to mount an LCD imager to a lens and further to provide some means for very minute adjustment of the lens for focusing purposes, and the like. Typically, the lens is provided with an apparatus such that the lens is screwed in or out in relation to the LCD imager by rotating the lens. This sort of apparatus will work reasonably well where a symmetrical lens is used, although minor imperfections in the lens and/or the mounting thereof my result in some undesirable effects when such lens is rotated.

It has been found to be necessary or desirable in some imaging systems to illuminate the LCD imagers off axis (i.e., not perpendicular to the plane of the imager's surface). In such systems it is necessary or desirable to precompensate the image by using a decentered portion of the field lens. In such instances, it would take up unnecessary space and weight to include an entire lens, where only a section of the lens is to be used. Therefore, the field lens will most desirably consist of only a section of a complete lens. Due to the off-axis architecture and the use of a decentered, sectioned lens, the lens cannot be easily adjusted by rotating the lens.

It would be desirable to have a method or apparatus that facilitates fine adjustment of a decentered field lens in an off axis LCD imager apparatus. However, to the inventor's knowledge, no such method or apparatus has existed in the prior art.

SUMMARY

Accordingly, it is an object of the present invention to provide a method and apparatus for mounting an imaging device which does not put any stress on the imaging device which might tend to deflect it and cause some distortion from its flat, unstressed condition.

It is another object of the present invention to provide a method and apparatus for mounting an imaging device which will hold the imaging device securely such that it is resistant to vibration and other external forces.

It is still another object of the present invention to provide a method and apparatus for mounting an imaging device which is easy and inexpensive to implement in a production environment.

It is yet another object of the present invention to provide a method and apparatus for mounting an imaging device which will result in a clearly focused image across the entire surface of the imaging device.

It is still another object of the present invention to provide a method and apparatus for mounting an imaging device which will allow for fine adjustment of a field lens without rotating the field lens.

It is yet another object of the present invention to provide a method and apparatus for mounting a field lens to an LCD imager which will allow for the use of a partial lens.

It is still another object of the present invention to provide a method and apparatus for mounting a field lens to an LCD imager which will prevent dust from getting between the LCD imager and the field lens.

Briefly, an embodiment of the inventive adjustment apparatus has a field lens affixed within a field lens mount, the field lens mount has external threads to mate with an internally threaded ring. The internally threaded ring is held in place by a retainer and may be turned within an assembly housing to move the field lens mount relatively in and out in relation to an LCD imager. There are two holes going through the mount which slip over two fingers extending from the assembly housing to prevent the field lens mount and attached lens from rotating relative to the housing.

The invention permits a decentered field lens to be mounted in such a way that it can be axially adjusted relative to an imager and still maintain a dust free air gap between the field lens and the imager.

An advantage of the present invention is an image is produced which is in focus in all areas of the image.

Another advantage of the present invention is that a decentered field lens can be adjusted.

Still another advantage of the present invention is that a portion of a field lens can be used to save weight and space.

Yet another advantage of the present invention is that it is easy and inexpensive to implement.

Still another advantage of the present invention is that an imaging device is securely mounted.

Yet another advantage of the present invention is that it is simple and inexpensive to manufacture and to use.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

BRIEF DESCRIPTION OF THE DRAWINGS

FIG. 1 is an exploded perspective view of a field lens adjustment apparatus according to the present invention;

FIG. 2 is an exploded perspective view showing a field lens and associated field lens mount.

DETAILED DESCRIPTION

Figure 3:
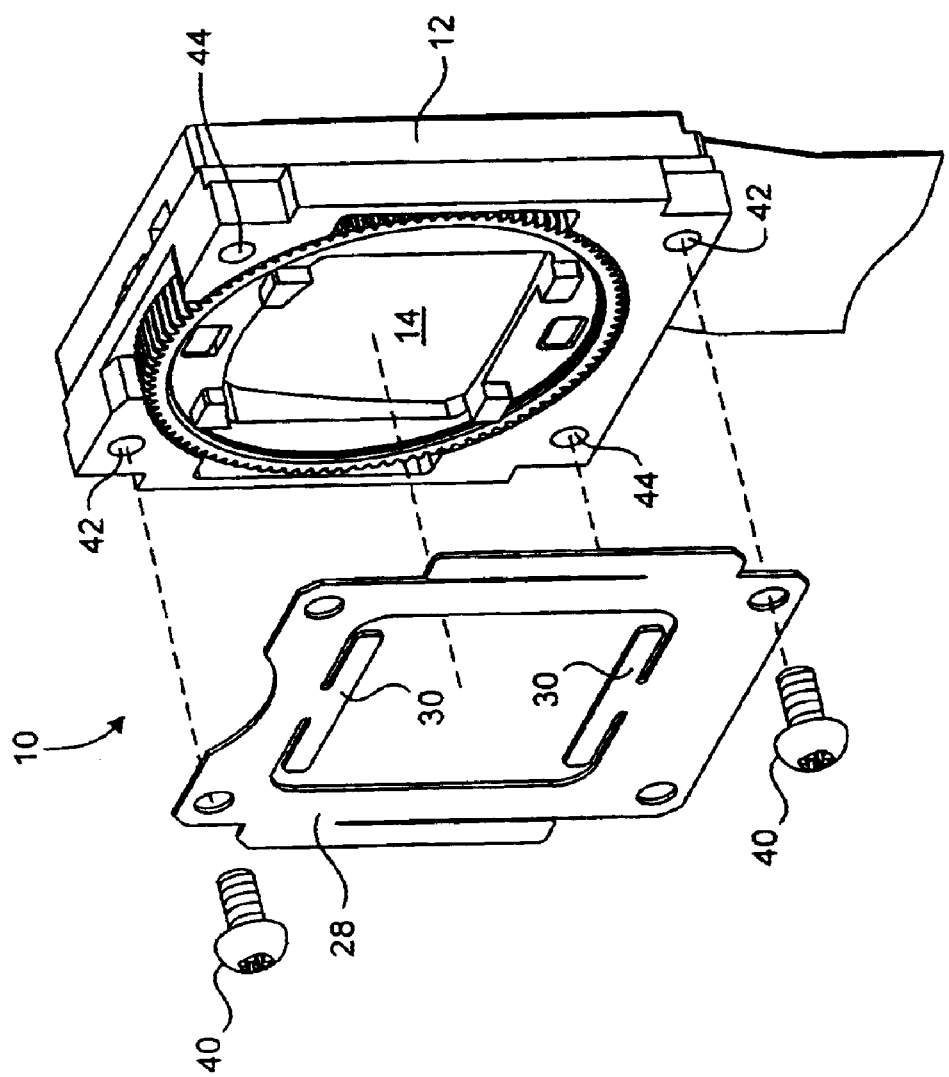
FIG. 3 is a partially exploded perspective view showing the field lens adjustment apparatus of FIG. 1.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is an LCD lens adjustment apparatus. The inventive LCD lens adjustment apparatus is depicted in an exploded perspective view in FIG. 1, and is designated therein by the general reference character 10. The adjustment apparatus 10 is affixed to an imager subassembly 12 in the view of FIG. 1. Imager subassembly 12 includes an LCD 13 mounted such that the image display area of LCD 13 (not otherwise visible in the view of FIG. 1) is visible through subassembly 12. The adjustment apparatus 10 has a field lens segment 14, a field lens mount 16, and an assembly housing 18. The LCD imager 13 may be a conventional imager, or may be any such alternate imager (e.g., a deformable mirror device) of the type which may now exist or which may be developed in the future. An image projected from the imager 13 will be directed and focused by the sectioned field lens 14. The sectioned field lens 14 is a decentered lens section which will re-direct an off axis imaging beam from the imager 13. One skilled in the art will recognize the value of this for use in an off axis projection system. As can be seen in the view of FIG. 1, the assembly housing 18 has a plurality (two, in this present example) of guide finger 20 projections, which will be discussed in more detail hereinafter. At least one guide finger is required, but those skilled in the art will recognize that one or more can be used depending on the demands of the particular system.

In the view of FIG. 1 can also be seen an internally threaded ring 22 which is adapted to thread onto external threads 23 on the field lens mount 16. A plurality of adjustment teeth 24 dispersed about the outer circumference of the threaded ring 22 are provided to provide a means whereby the threaded ring 22 can be manually rotated. Although it is not a feature of the particular described embodiment, it is within the scope of the invention that some motorized means might be employed to engage the adjustment teeth 24 to provide for automated adjustment of the adjustment apparatus 10.

As can also be seen in the view of FIG. 1, the field lens mount 16 has a plurality (two, in the present example) of guide slots 26 for fitting over the guide fingers 20 on the assembly housing 18 such that the field lens mount 16 is prevented from rotating in relation to the assembly housing 18 when the threaded ring 22 is rotated to move the field lens mount 16, with the field lens segment 14 attached, in or out in relation to the imager 13. This maintains the rotational relationship of the field lens segment 14 to the imager 13 while allowing movement of the field lens segment 14 toward or away from the imager 13 for focusing an image generated by imager 13.

A retainer 28 prevents the field lens mount 16 and the threaded ring 22 from coming completely away from the assembly housing 18, while still allowing some movement of the field lens mount 16 in relation to the imager 12, as discussed above. A plurality (two, in this present example) of preload flexures 30 on the retainer 28 provide some pressure against a plurality of posts 32 on the field lens mount 16 such that the field lens mount 16 is pressed slightly toward the image 12. This provides for a more positive adjustment, and tends to prevent the threaded ring 22 from turning too freely such that inadvertent movement of the threaded ring 22 and the field lens mount 16 tends to be prevented.

In the view of FIG. 1 it can be seen that a plurality (two, in this present example) of screws 40 secure the retainer 28 to the assembly housing 18, thereby holding the entire adjustment apparatus 10, as described herein, together. In this presently described embodiment 10 of the invention, the screws 40 fit into two of four threaded screw holes 42 in the assembly housing 18. In this present embodiment 10 of the invention, the remaining two screw apertures 44 are used to affix the imager 12 onto the assembly housing 18.

FIG. 2 is an exploded perspective view showing the field lens segment 14 detached from the field lens mount 16. In this particular embodiment, the sectioned field lens 14 is affixed within the field lens mount 16 by an adhesive (not shown).

FIG. 3 is a partially exploded perspective view of an example of the inventive adjustment apparatus 10 assembled to the imager 12. In the view of FIG. 3 it can be seen how the several parts described fit together, as previously discussed herein. In this view, the screws 40 and the retainer 28 which is held in place by the screws 40 are shown removed so that the assembly within can be seen.

Various modifications may be made to the invention without altering its value or scope. For example, the size, shape, and placement of components described herein may each or all be varied according to the requirements of the particular application.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive improved adjustment apparatus 10 is intended to be widely used in the construction of projection type imaging devices. Currently, the invention is being applied to the construction of multi channel imaging devices using reflective type LCD devices such that three of the imager subassemblies 12 and associated field lens segments 14 and adjustment apparatus 10 are used. However, it is within the scope of the invention that other types of display devices (not shown) could be employed, and other types of imaging engines constructed, according to the present inventive method.

The inventor has discovered that application of the present invention provides for fine adjustment of the field lens segment 14 without undue effort and with no appreciable slack in the adjustment such that the field lens segment 14, once adjusted, remains in position until it can be further secured.

Since the improved adjustment apparatus 10 of the present invention may be readily produced and integrated with existing video creation and display systems and devices, and since the advantages as described herein are provided, it is expected that it will be readily accepted in the industry. For these and other reasons, it is expected that the utility and industrial applicability of the invention will be both significant in scope and long-lasting in duration.

I claim:

1. An adjustment apparatus for adjusting a lens, comprising:
   a lens mount having external threads thereon;
   a ring having internal threads for mating with the external threads on the lens mount;
   a housing for receiving said lens mount and said ring; and
   at least one projection and at least one slot for receiving said projection such that relative rotational motion of said projection within said slot is prevented.

2. The adjustment apparatus of claim 1, wherein:
   said projection is free to move into or out of said slot.

3. The adjustment apparatus of claim 1, wherein:
   said projection is on said housing; and
   said slot is on said lens mount.

4. The adjustment apparatus of claim 1, wherein:
   the quantity of projections is two; and
   the quantity of slots is two.

5. The adjustment apparatus of claim 1, wherein:
   said lens mount is adapted to receive a sectioned lens.

6. The adjustment apparatus of claim 1, wherein:
   said lens mount is adapted to receive a decentered lens.

7. The adjustment apparatus of claim 1, and further including:
   a retainer for holding said lens mount and said ring to said housing.

8. The adjustment apparatus of claim 7, wherein:
   the retainer has at least one preload flexure for pressing against said lens mount.

9. The adjustment apparatus of claim 8, wherein:
   the preload flexure presses against a post on said lens mount.

10. The adjustment apparatus of claim 8, wherein:
    the quantity of preload flexures is two.

11. The adjustment apparatus of claim 1, wherein:
    said ring has a plurality of adjustment teeth about the outer circumference thereof.

12. An adjustment apparatus for adjusting a lens relative to an imager subassembly, comprising:
    a housing adapted to be mounted to the imager subassembly;
    a lens mount affixed to said housing such that said lens mount is at least partially movable toward and away from the imager subassembly;
    a screw device for moving said lens mount toward and away from the imager subassembly; and
    a slot and corresponding post for preventing said lens mount from rotating relative to the imager.

13. The adjustment apparatus of claim 12, wherein:
    said screw device includes external threads on said lens mount and an internally threaded ring adapted engage the external threads.

14. The adjustment apparatus of claim 12, wherein:
    the lens mount is adapted to accept a sectioned lens.

15. The adjustment apparatus of claim 12, wherein:
    the lens mount is adapted to accept a decentered lens.

16. The adjustment apparatus of claim 12, and further including:
    a retainer for retaining said lens mount within said housing.

17. The adjustment apparatus of claim 16, wherein:
    said retainer is affixed to the imager subassembly by screws.

18. The adjustment apparatus of claim 17, wherein:
    the quantity of screws is two.

19. The adjustment apparatus of claim 16, wherein:
    said retainer includes at least one flexure for pressing against said lens mount.

20. The adjustment apparatus of claim 12, wherein:
    said post is a projection on said housing; and
    said slot is in said lens mount.

21. An adjustable mount for mounting a lens to an imager subassembly, said mount comprising:
    a lens mount coupled to an imager subassembly; and
    means for displacing said lens mount inward toward and outward from said imager subassembly while preventing rotation of said lens mount with respect to said imager subassembly.

22. The adjustable mount of claim 21, wherein:
    said lens mount is adapted to receive a sectioned lens.

23. The adjustable mount of claim 21, wherein:
    said lens mount is adapted to receive a decentered lens.

* * * * *